Patented Dec. 27, 1949

2,492,855

UNITED STATES PATENT OFFICE 2,492,855

THERMOSETTING POLYARYLBIGUANIDE-FORMALDEHYDE RESINS

Arthur L. Fox and Herbert L. Sanders, Easton, Pa., and Robert T. Olsen, Phillipsburg, N. J., assignors to General Aniline & Film Corporation, New York, N. Y., a corporation of Delaware No Drawing. Application November 8, 1946, Serial No. 708,802

6 Claims. (Cl. 260—45.2)

This invention relates to novel thermosetting resins obtained by treating with formaldehyde a polyarylbiguanide resin (which in turn may be obtained by reacting, as more fully described hereinafter, an aromatic pirmary or secondary amine with formaldehyde to form an amine-formaldehyde reaction product which is then reacted with dicyandiamide) and to products treated with such polyarylbiguanide-formaldehyde resins. While it has heretofore been proposed to condense an aromatic amine, formaldehyde and dicyandiamide either in one operation or by adding these reactants in any order, the resins which have been so obtained heretofore have in general been thermoplastic and have relatively little utility.

It has now been discovered that if a polyarylbiguanide resin is produced by first reacting an aromatic primary or secondary amine with formaldehyde in equal molar proportions to form an amine-formaldehyde reaction product which is then reacted with dicyandiamide and the thus-obtained thermoplastic resin is then treated with formaldehyde, the novel thermosetting resins of this invention are obtained which have quite different properties both chemically and physically from any of the resins obtainable by reacting an aromatic amine, formaldehyde and dicyandiamide in a different manner than that herein specified are treated with formaldehyde. These novel thermosetting resins may be converted by heat into hard, infusible, water-insoluble, clear, glass-like resins, but prior to their treatment with heat they are water-soluble and capable of ready application in the art, being particularly suitable for impregnating textile and other fibrous materials in order to impart many desirable properties thereto.

The method of preparation of these novel thermosetting polyarylbiguanide-formaldehyde resins is schematically shown below:

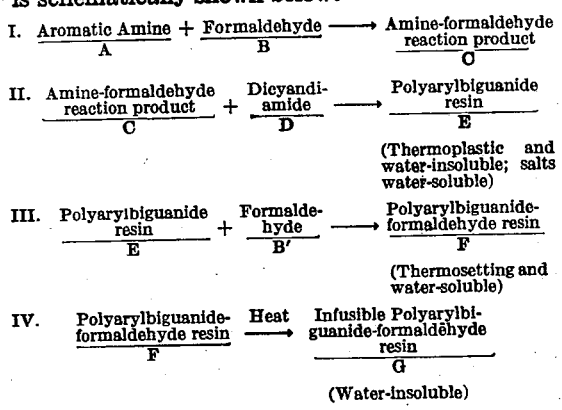

It has been found that the order of reaction of the aromatic amine, formaldehyde and dicyandiamide employed in producing these novel thermosetting resins is quite critical and in order to produce the novel resins of this invention the order of reaction illustrated above should be employed, since when other methods of formation are employed, resins having quite different properties from those obtained when the above procedure is followed are obtained. Thus, if the components dicyandiamide and formaldehyde are reacted initially and the thus-obtained product is then treated with an aromatic amine, the resulting product does not yield a thermosetting resin on treatment with further amounts of formaldehyde. It appears that dicyandiamide reacts much more readily with formaldehyde than do aromatic amines, i. e. aniline. Consequently, if the order of reaction be changed so that the initial reaction takes place between formaldehyde and dicyandiamide, or a mixture of the three components reacted, the reaction will yield a dicyandiamide-formaldehyde type of resin in preference to the amine-formaldehyde condensation product with dicyandiamide. Likewise, if the dicyandiamide is reacted initially with an aromatic amine, the resultant phenyl biguanides or their salts do not form a thermosetting resin with formaldehyde in acid media.

It has been found that the amine-formaldehyde reaction product (compound C in the above outline) must be that obtainable by reacting equimolar amounts of formaldehyde and aromatic amine if the novel thermosetting resins of this invention are to be obtained. Such an equimolar amine-formaldehyde reaction product may most readily be obtained by employing equimolar amounts of formaldehyde and aromatic amine as in step I of the above outline. In the event that an excess of either aromatic amine or formaldehyde is employed in this step, the equimolar amine-formaldehyde reaction product should be separated and any excess amine or formaldehyde removed therefrom prior to treating this reaction product with dicyandiamide. Thus, when an excess of amine is reacted with formaldehyde in step I of the above outlined process and the thus-obtained reaction product without purification is then reacted with dicyandiamide, the polyarylbiguanide resin so obtained fails to form thermosetting resins on treatment with further amounts of formaldehyde, but instead forms sticky thermoplastic resins having relatively limited uses. On the other hand, when an excess of formaldehyde is employed in the initial reaction with the aromatic amine and the thus-obtained product without purification reacted with dicyandiamide, a gummy mass is obtained which is extremely insoluble in water and aqueous acids and consequently, the subsequent reaction with further amounts of formaldehyde cannot be performed readily.

While the relative amounts of formaldehyde employed in the initial reaction (step I above)

of the aromatic amine with formaldehyde are highly critical, it has been found that the relative amounts of formaldehyde employed in the subsequent treatment of the thermoplastic water-insoluble polyarylbiguanide resin or its water-soluble salt with formaldehyde are not so critical. Approximately one mol of formaldehyde must be employed for each mol of polyarylbiguanide resin in this step (step III of the above outline) in order to obtain a thermosetting resin, but further quantities of formaldehyde may be employed and, for particular uses, may be desirable. Thus, valuable resins have been obtained when the relative amount of formaldehyde to polyarylbiguanide resin in this subsequent reaction (step III above) was within the range of from 1:1 to 10:1—preferably about 4:1.

A wide variety of aromatic primary and secondary amines may be employed as a reactant in step I of the above outline. The aromatic amines which are suitable for use in producing the novel resins of this invention may be represented by the formula:

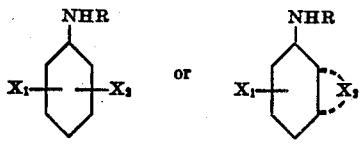

where R equals hydrogen, alkyl (e. g. methyl, ethyl) or aryl (e. g. phenyl) and $X_1$ and $X_2$ equal hydrogen, alkyl (methyl, ethyl), aryl (phenyl, tolyl), halogen (bromine, chlorine, fluorine), halogenated alkyl (e. g. trifluoromethyl), alkoxy (e. g. methoxy, ethoxy), aryloxy (e. g. phenoxy), nitrol groups and the like and where $X_2$ may form a condensed ring system, as naphthalene, quinoline, etc.

As specific examples of such primary and secondary aliphatic amines may be mentioned: aromatic primary amines (such as aniline, α-naphthylamine, β-naphthylamine, 2-toluidine, 3-toluidine, xylidine), alkoxy aromatic amines (e. g. 2 - anisidine, 3 - anisidine), aryloxy aromatic amines (e. g. 2-phenoxyaniline, 3-phenoxyaniline), aryl aromatic amines (e. g. 2-aminodiphenyl, 3-aminodiphenyl), halogenated aromatic amines (e. g. 2-chloroaniline, 3 - chloro - 2 - toluidine, 2,5-dichloroaniline), nitro aromatic amines (2-nitroaniline, 3-nitroaniline), aromatic secondary amines, e. g. N-alkyl aromatic amines (e. g. N-ethyl-5-nitrotoluidine, N-methyl-2-nitroaniline), and N-aryl aromatic amines (e. g. diphenylamine, 2-nitrodiphenylamine, 2-chlorodiphenylamine) and the like.

It has been found that the resins obtained when halogenated aromatic amines such as 2-chloroaniline, 3-chloro-2-toluidine, 2,5-dichloroaniline or 2-chlorodiphenylamine mentioned above are employed as reactants in producing the resins of this invention, are particularly valuable for use in treating textiles and similar applications since they are more stable to light than the resins obtained when unhalogenated aromatic amines are employed. However, where light stability is not important, resins having desirable properties may be obtained with any of the aromatic amines of the type specified above.

It will be understood that in place of formaldehyde an equivalent amount of some formaldehyde-yielding compound such as trioxymethylene, para-formaldehyde, methylal and the like may be employed.

The initial reaction (step I of the above outline) may be readily carried out by merely adding aqueous formaldehyde to the aromatic amine. In this reaction the amine is preferably employed in the form of an acid salt, either the salt of a strong mineral acid such as hydrochloric, sulphuric, phosphoric acid and the like, or of an organic carboxylic acid, preferably one having a relatively low molecular weight such as acetic, butyric and the like, or an organic sulphonic acid. The reaction proceeds readily at room temperature and at atmospheric pressure and with stirring or other agitation is completed within seven hours.

The thus-obtained amine-formaldehyde reaction product may then readily be reacted without further purification, if neither of the reactants were present in excess, by adding to the suspension thereof dicyandiamide. In order to speed up this reaction (step II of the above outline) some heat is preferably employed. It has been found that the reaction may readily be completed by heating to reflux for about two hours. The thus-obtained polyarylbiguanide resin (compound D in the above outline) which is thermoplastic and water-insoluble, may then be recovered by any suitable method (for instance, by the addition of alkali to the reaction mixture) in order to precipitate the polyarylbiguanide which may then be removed by filtration and dried if desired.

The thus-obtained polyarylbiguanide resin is then converted into the novel thermosetting resins of this invention by treating the same with one or more mols of formaldehyde (step III of the above outline). This step of the process is most readily carried out by treating with formaldehyde the polyarylbiguanide resin, preferably in the form of a water-soluble salt formed by reaction of the polyarylbiguanide with such inorganic acids as hydrochloric, sulphuric, phosphoric acids or such organic carboxylic acids as acetic, butyric, lauric and the like or organic sulphonic acids such as benzene sulphonic acids and the like. We particularly prefer the short chain organic carboxylic acids, since these salts are slightly more soluble and the polymer obtained with formaldehyde has somewhat less tendency to "tender" fabrics, particularly those of vegetable origin. This reaction of the polyarylbiguanide resin salt with formaldehyde may advantageously be carried out at a temperature of about 50° C. and the resultant polyarylbiguanide-formaldehyde resin may then be recovered by evaporation. This novel polyarylbiguanide-formaldehyde resin is water-soluble and can readily be converted into an infusible, clear, hard, water-insoluble resin by heat, either in bulk or in situ on a suitable base material impregnated therewith. It has been found that a resin is completely set by heating to a temperature of 105° C. for an hour or 130° C. for 15 minutes.

The following specific examples illustrate the preferred embodiments of this invention:

*Example 1*

A sample (1960 g.) of freshly distilled 3-chloro-2-toluidine is dissolved in a solution of 1190 cc. of hydrochloric acid ($d=1.18$) in 25 liters of water. Pure nitrogen is bubbled through the solution to displace the air and 1250 cc. of 36% aqueous formaldehyde added over a period of 1 hour. The resulting suspension is stirred at room temperature for 4 hours, during which time the amine hydrochloride and formaldehyde react with the development of a distinct yellow color. To the suspension is added 1250 g. of dicyandiamide and the whole heated to refluxing. After refluxing for 2 hours, the greater part of the solid dissolves. The solution is boiled for 2 hours longer, cooled to room temperature and the clear solution made strongly alkaline with a solution of 320 g. of sodium hydroxide in 1 liter of water. The precipitated solid is collected and may be dried at room temperature, in an oven at 95° C., or on a steam-heated drum drier. The yield of colorless to yellow polymer is 2000 g. or 61% of the theory.

The solid (2000 g.) is dissolved in a mixture of 2900 cc. of water and 480 cc. (520 g.) of glacial acetic acid with slight warming. To the clear solution is added 3260 g. of 36% aqueous formaldehyde. The solution is centrifuged. The clear, light yellow solution contains 30% solid by evaporation.

When a sample is dried and baked at 105° C. for an hour, or at 130° C. for 15 minutes, a clear, hard, water-insoluble resin is formed.

As an example of the utility of this resin, a piece of woolen broadcloth may be padded through a 10% aqueous solution of the resin, dried, then baked 10 minutes at 140° C. On laundering, this piece shrinks less than 4% in either direction, whereas a similar untreated piece will shrink about 20%.

A 2% solution of this resin applied to paper sheet and baked will increase the wet-strength fivefold or more.

Solutions in the neighborhood of 1% concentration, when applied to cotton yarn in the presence of certain levelling agents and then baked, impart a remarkable receptivity to wool dyes.

Very highly concentrated solutions (about 60%) can be applied to wood surfaces for the formation of extremely strong plywood laminates.

It was found that the presence of 1 mol of formaldehyde per mol of polyarylbiguanide resin was sufficient to yield a clear, insoluble resin film when a sample was baked on a glass plate. For shrink-proofing textiles, the resin having 4 mols of formaldehyde per mol of polyarylbiguanide was much more effective.

*Example 2*

A polyarylbiguanide was prepared as in Example 1, except that the 3-chloro-2-toluidine was replaced by aniline. The product (100 parts) was dissolved in a mixture of 20 parts glacial acetic acid and 880 parts water to yield a 10% polyarylbiguanide solution.

A portion of this solution was dried on a watchglass and baked for 10 minutes at 140° C. The resultant glassy film was still water-soluble, however.

To another portion of this solution was added a quantity of 40% formalin, equivalent to 4 mols of formaldehyde per mol of polyarylbiguanide resin. On drying and baking as above, a hard transparent glass was obtained which was now found to be completely insoluble in water. Weight determinations showed that a large part of the acetic acid and formaldehyde present in the solution were retained in the baked insoluble and infusible film.

A strip of cotton may be dipped in the resin solution, squeezed out, dried, then baked for 5 minutes at 120° C. A mildew- and rot-resistant finish is thus obtained.

The polyarylbiguanide-formaldehyde resin is stable in acidic solutions (i. e. pH 5) unlike ureaformaldehyde or melamine-formaldehyde types.

*Example 3*

A polyarylbiguanide-formaldehyde resin solution was prepared as in Example 1, except that the 3-chloro-2-toluidine was replaced by 6-chloro-$\alpha,\alpha,\alpha$-trifluoro-3-toluidine.

Strips of unsized cotton muslin were soaked in the resin solution, then the excess solution removed. The strips were dried at 50° C. and baked at 130° C. The crease-proofing of the strips was satisfactory (2.7 cm. spread by U. S. Army Spec. 100-48), with no apparent increase in stiffness. The strips were almost unaffected by treatment for 10 minutes with a solution of sodium hypochlorite (0.5% active chlorine) or exposure to ultra-violet light from a "Hanovia" lamp (type 16200) for 1 hour at a distance of 6" from the lamp.

We claim:

1. A process of producing thermosetting polyaryl-biguanide-formaldehyde resins, which comprises reacting formaldehyde with an aromatic amine condensable therewith and selected from the group consisting of primary and secondary arylamines of the formula RNHR', in which R stands for a member of the group consisting of aryl and halogenated aryl radicals and R' stands for a member of the group consisting of hydrogen, lower alkyl and aryl radicals and halogenated lower alkyl and halogenated aryl radicals in an acid medium and in equimolecular amounts to form an amine-formaldehyde reaction product, reacting the thus-obtained equimolar amine-formaldehyde reaction product with a substantially equimolar amount of dicyandiamide while heating the same at a temperature up to reflux temperature to form a thermoplastic polyaryl biguanide resin and treating the thus-obtained polyaryl biguanide resin with at least an equimolar amount of formaldehyde to form said thermosetting polyarylbiguanide-formaldehyde resin.

2. Thermosetting polyarylbiguanide-formaldehyde resins produced in accordance with claim 1.

3. The process as defined in claim 1, wherein the aromatic amine specified is halogenated aniline.

4. Thermosetting polyarylbiguanide-formaldehyde resins produced in accordance with claim 3.

5. The process as defined in claim 1, wherein the aromatic amine specified is halogenated toluidine.

6. Thermosetting polyarylbiguanide-formaldehyde resins produced in accordance with claim 5.

ARTHUR L. FOX.
HERBERT L. SANDERS.
ROBERT T. OLSEN.

REFERENCES CITED

The following references are of record in the file of this patent:

UNITED STATES PATENTS

| Number | Name | Date |
| --- | --- | --- |
| 1,777,140 | Hildebrand | Sept. 30, 1930 |
| 2,013,589 | Sutter | Sept. 3, 1935 |
| 2,228,514 | Griessbach | Jan. 14, 1941 |
| 2,331,376 | D'Alelio | Oct. 12, 1943 |
| 2,340,046 | D'Alelio | Jan. 25, 1944 |
| 2,341,266 | D'Alelio | Feb. 8, 1944 |
| 2,427,512 | Scott | Sept. 16, 1947 |

FOREIGN PATENTS

| Number | Country | Date |
| --- | --- | --- |
| 520,573 | Great Britain | Apr. 26, 1940 |